(12) United States Patent
Omori et al.

(10) Patent No.: US 9,211,852 B2
(45) Date of Patent: Dec. 15, 2015

(54) CONDUCTIVE PLATE AND JOINT CONNECTOR

(75) Inventors: Yasuo Omori, Yokkaichi (JP); Hidefumi Horiuchi, Yokkaichi (JP); Takamaru Amano, Yokkaichi (JP); Yuji Kitagawa, Yokkaichi (JP); Takashi Tsuchiya, Yokkaichi (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

(*) Notice: Subject to any disclaimer, the term of this patent is extended or adjusted under 35 U.S.C. 154(b) by 0 days.

(21) Appl. No.: 14/345,727

(22) PCT Filed: Sep. 11, 2012

(86) PCT No.: PCT/JP2012/073141
§ 371 (c)(1),
(2), (4) Date: Mar. 19, 2014

(87) PCT Pub. No.: WO2013/042576
PCT Pub. Date: Mar. 28, 2013

(65) Prior Publication Data
US 2014/0220792 A1    Aug. 7, 2014

(30) Foreign Application Priority Data
Sep. 20, 2011    (JP) .................................. 2011-204326

(51) Int. Cl.
*H01R 33/00* (2006.01)
*B60R 16/02* (2006.01)
(Continued)

(52) U.S. Cl.
CPC  *B60R 16/02* (2013.01); *H01R 4/64* (2013.01); *H01R 4/34* (2013.01); *H01R 13/501* (2013.01); *H01R 13/5213* (2013.01); *H01R 2201/26* (2013.01)

(58) Field of Classification Search
CPC ..................................................... H01R 13/648

USPC ........................................................... 439/34
See application file for complete search history.

(56) References Cited

U.S. PATENT DOCUMENTS 8,025,538 B2    9/2011  Hara et al.
8,100,730 B2    1/2012  Hara et al.
(Continued)

FOREIGN PATENT DOCUMENTS

JP    2000-77140    3/2000
JP    2011-60522    3/2011
(Continued)

OTHER PUBLICATIONS

International Search Report of Dec. 5, 2012.

*Primary Examiner* — Abdullah Riyami
*Assistant Examiner* — Nelson R Burgos-Guntin
(74) *Attorney, Agent, or Firm* — Gerald E. Hespos; Michael J. Porco; Matthew T. Hespos

(57) ABSTRACT

A conductive plate (30) for grounding a plurality of first ground wires (W) to a body of a vehicle includes a conductive plate main body (31) with a body-side grounding portion (34) to be grounded to the body by being bolted to the body. Terminal connecting portions (32B) are on one end of the conductive plate main body (31) and are to be connected to wire-side terminals (21) electrically connected to the respective first ground wires (W). A first rib group (37) and a second rib group (38) project from the conductive plate main body (31) in a thickness direction of the conductive plate main body (31) and set the rigidity of the conductive plate main body (31) to be low at a position close to the body-side grounding portion (34) and high at a position distant from the body-side grounding portion (34).

6 Claims, 11 Drawing Sheets

(51) Int. Cl.
 *H01R 4/64* (2006.01)
 *H01R 4/34* (2006.01)
 *H01R 13/50* (2006.01)
 *H01R 13/52* (2006.01)

(56) References Cited

U.S. PATENT DOCUMENTS 8,137,116 B2 3/2012 Omori et al.

2011/0111639 A1* 5/2011 Hara et al. .................... 439/660
2011/0111640 A1* 5/2011 Hara et al. .................... 439/660
2011/0269323 A1* 11/2011 Omori et al. .................. 439/108
2011/0294317 A1* 12/2011 Nishio et al. .................... 439/95

FOREIGN PATENT DOCUMENTS

| JP | 2011-103192 | 5/2011 |
| JP | 2011-103193 | 5/2011 |

\* cited by examiner

CONDUCTIVE PLATE AND JOINT CONNECTOR

BACKGROUND

1. Field of the Invention

The present invention relates to a conductive plate and a joint connector for grounding a plurality of wires to a body of a vehicle.

2. Description of the Related Art

A joint connector disclosed in Japanese Unexamined Patent Publication No. 2011-60522 is known as a joint connector of this type including a conductive plate. This joint connector includes a plurality of terminal-provided wires whose wire-side terminals are electrically connected to ends of wires, a conductive plate and a housing for holding these terminal-provided wires and conductive plate. This conductive plate includes a plurality of terminal connecting portions to be fitted to the wire-side terminals of the respective terminal-provided wires in a terminal connecting direction and a conductive plate main body including a body-side grounding portion to be grounded to a body by being bolted to a wall surface of the body, and the respective terminal connecting portions are coupled to the conductive plate main body while being arranged in a direction substantially perpendicular to the terminal connecting direction and substantially parallel to the wall surface of the body.

However, since the body-side grounding portion of the above conductive plate is firmly fixed to the body by the bolt, both vibration from the body and vibration from a wire side are transmitted to the body-side grounding portion and a stress is concentrated near the body-side grounding portion of the conductive plate main body and there is a possibility of breakage and the like of the conductive plate main body in this stress concentrated part.

The present invention was completed in view of the above situation and aims to disperse a stress transmitted to a conductive plate main body.

SUMMARY OF THE INVENTION

The present invention is directed to a conductive plate for grounding a plurality of wires to a body of a vehicle, including a conductive plate main body including a body-side grounding portion to be grounded to the body by being bolted to the body, a plurality of terminal connecting portions provided on one end of the conductive plate main body and to be connected to wire-side terminals electrically connected to the respective wires, and a protrusion projecting from the conductive plate main body in a thickness direction of the conductive plate main body and provided to set the rigidity of the conductive plate main body to be low at a position close to the body-side grounding portion and high at a position distant from the body-side grounding portion.

Further, the present invention may be applied to a joint connector, including the above conductive plate, a plurality of terminal-provided wires in each of which a wire-side terminal is electrically connected to a wire, and a housing integrally molded to the conductive plate and configured to hold the respective terminal-provided wires connected to the respective terminal connecting portions of the conductive plate.

According to such configurations, a stress is not concentrated at the position close to the body-side grounding portion and can be dispersed also to the position distant from the body-side grounding portion since the protrusion is provided to set the rigidity of the conductive plate main body to be lower at the position close to the body-side grounding portion than at the position distant from the body-side grounding portion. Thus, it is not necessary to thicken the conductive plate main body or use an expensive metal material, wherefore cost of the conductive plate can be suppressed low.

The following configurations are preferable embodiments of the present invention.

A height of the protrusion may be low at the position close to the body-side grounding portion and high at the position distant from the body-side grounding portion.

According to such a configuration, the rigidity of the protrusion can be appropriately adjusted by adjusting the height of the protrusion. Specifically, if the height of the protrusion is set to be high, the rigidity can be increased as compared with the case where the height of the protrusion is low.

A width of the protrusion may be large at the position close to the body-side grounding portion and small at the position distant from the body-side grounding portion.

According to such a configuration, the rigidity of the protrusion can be appropriately adjusted by adjusting the width of the protrusion. Specifically, if the width of the protrusion is set to be small, the rigidity can be increased as compared with the case where the width of the protrusion is large.

The protrusion may be formed by arranging a plurality of ribs each extending while having a constant height, and heights or widths of the respective ribs may differ from each other.

According to such a configuration, a stress can be dispersed by providing a plurality of ribs on the conductive plate main body.

A coupling portion for coupling the respective terminal connecting portions may be insert-molded in the housing.

According to such a configuration, each terminal connecting portion can be firmly held with respect to the housing since the coupling portion is covered with resin of the housing.

The coupling portion may be coupled to one end of the conductive plate main body via a step portion.

According to such a configuration, a stress applied to the coupling portion can be dispersed to the step portion.

The protrusion may be provided from the conductive plate main body to the step portion.

According to such a configuration, the step portion can be reinforced by the protrusion.

According to the present invention, it is possible to disperse a stress transmitted to a conductive plate main body.

DETAILED DESCRIPTION OF THE PREFERRED EMBODIMENTS

An embodiment of the present invention is described with reference to FIGS. 1 to 11. A joint connector 10 in this embodiment constitutes a part of a wiring harness in a vehicle. Specifically, the wiring harness includes a wiring harness main body formed by a plurality of wires and the joint connector 10. Out of these, the wires constituting the wiring harness main body include a plurality of first ground wires W and a second ground wire (not shown) different from the first ground wires W. These ground wires W are each composed of a conductor W1 and an insulation coating W2 covering the conductor W1, and collectively connected to a ground section of the vehicle via the joint connector 10. Although not shown, this ground section is formed by a ground bolt projecting inwardly from a wall surface of a body of the vehicle.

Each first ground wire W is for grounding a specific circuit connected to the wiring harness to the ground section and one end thereof is connected to the ground section and the other end thereof is connected to the circuit. The second ground wire is for connecting the ground section to another ground section for the purpose of fail-safe even if a ground failure occurs due to the damage or the like of the ground section, and one end thereof is connected to the ground section and the other end thereof is connected to the other ground section. Note that the second ground wire has a larger outer diameter than the first ground wires W to ensure a large current capacity and a second ground terminal (not shown) is connected to an end thereof.

Figure 1:
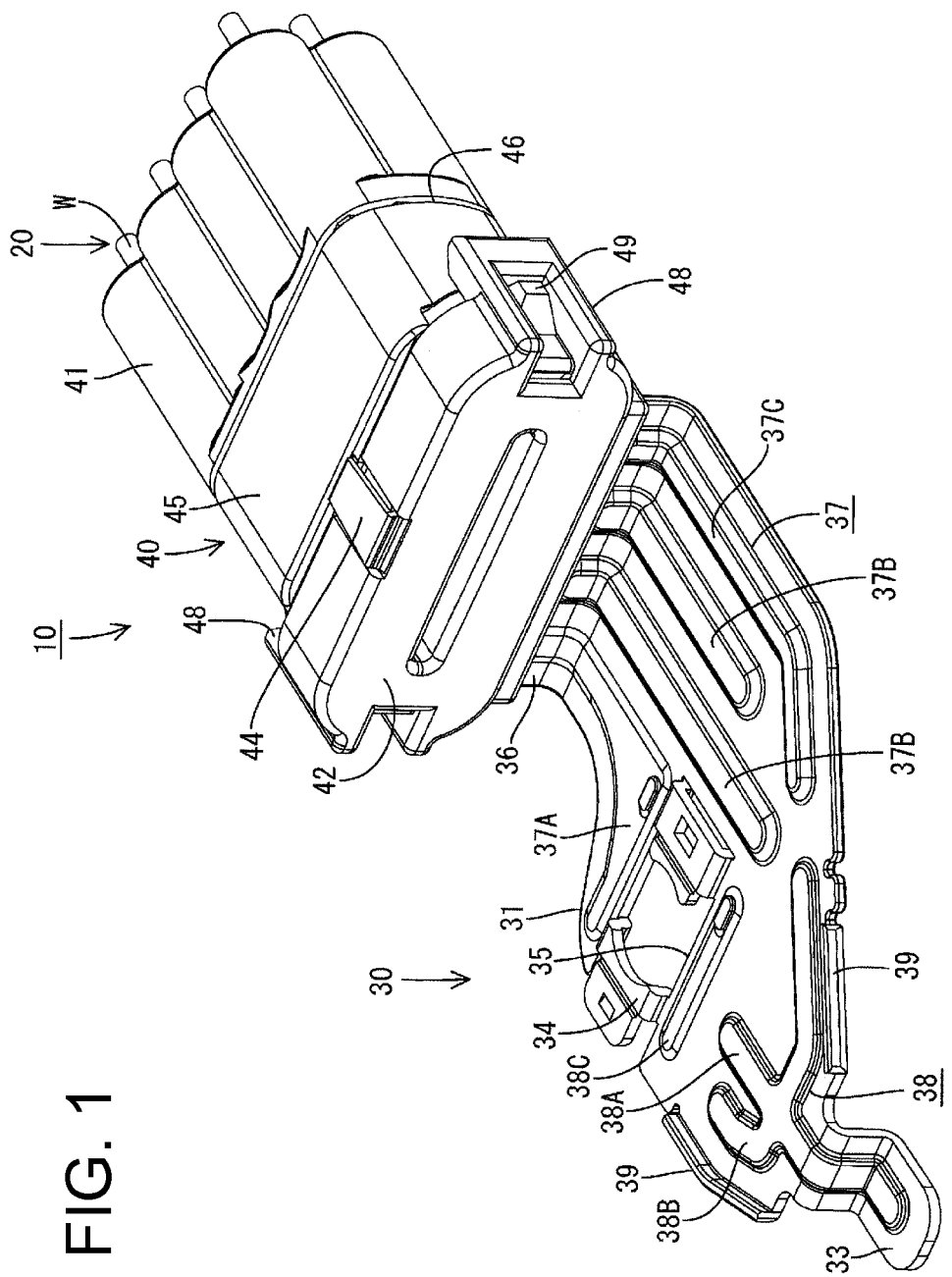
FIG. 1 is a perspective view of a joint connector according to an embodiment.

As shown in FIG. 1, the joint connector 10 includes a plurality of terminal-provided wires 20, a conductive plate 30 and a housing 40.

Figure 11:
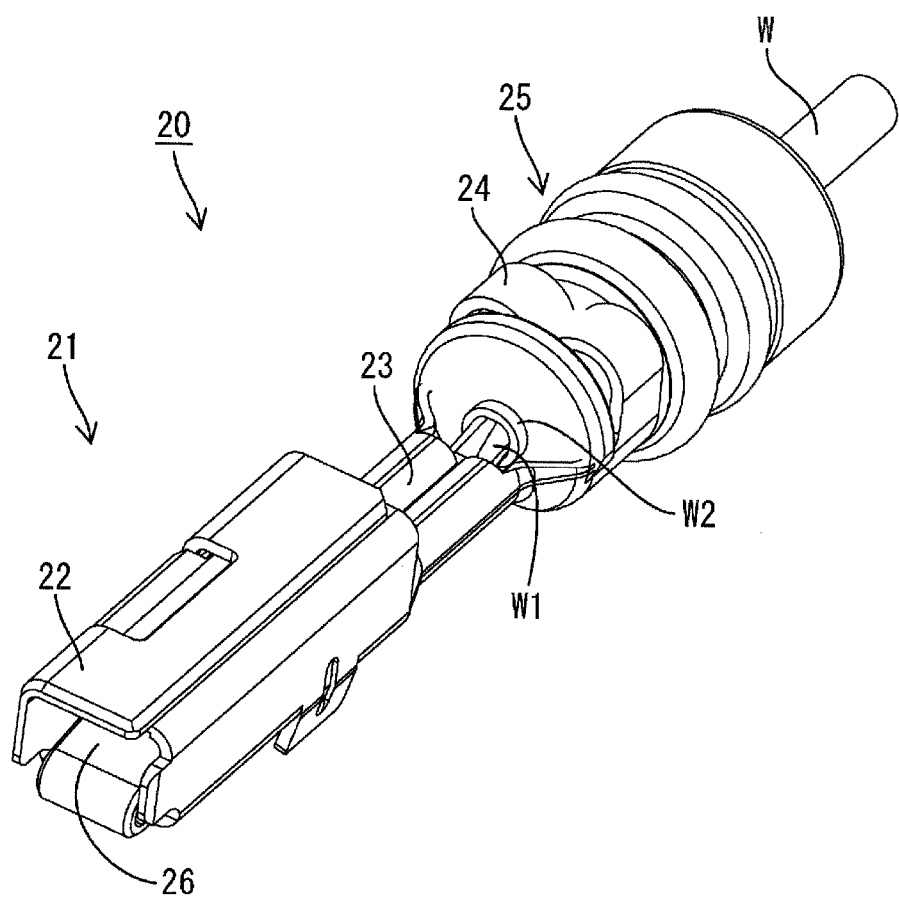
FIG. 11 is a perspective view of a terminal-provided wire.

Out of these, the terminal-provided wire 20 is formed by electrically connecting a wire-side terminal 21 to an end of the first ground wire W as shown in FIG. 11. The wire-side terminal 21 includes a box-shaped terminal main body 22, a wire barrel 23 provided behind this terminal main body 22, and an insulation barrel 24 provided behind this wire barrel 23. The wire barrel 23 is crimped to the conductor W1 of the first ground wire W, whereby the conductor W1 and the wire-side terminal 21 are conductively connected. Further, a rubber plug 25 is externally fitted on an end of the insulation coating W2 of the first ground wire W, and the insulation barrel 24 is crimped to an end of the insulation coating W2 together with the rubber plug 25.

The terminal main body 22 is in the form of a rectangular tube and extends in a front-back direction. A resiliently deformable resilient contact piece 26 is accommodated in this terminal main body 22. When a mating terminal is fitted into the terminal main body 22, the resilient contact piece 26 resiliently comes into contact with this mating terminal and the wire-side terminal 21 and the mating terminal are conductively connected. The terminal main body 22 is smaller than the rubber plug 25 so as not to interfere with the inner wall of a rubber plug accommodating portion 41 into which the rubber plug 25 is to be accommodated.

Figure 2:
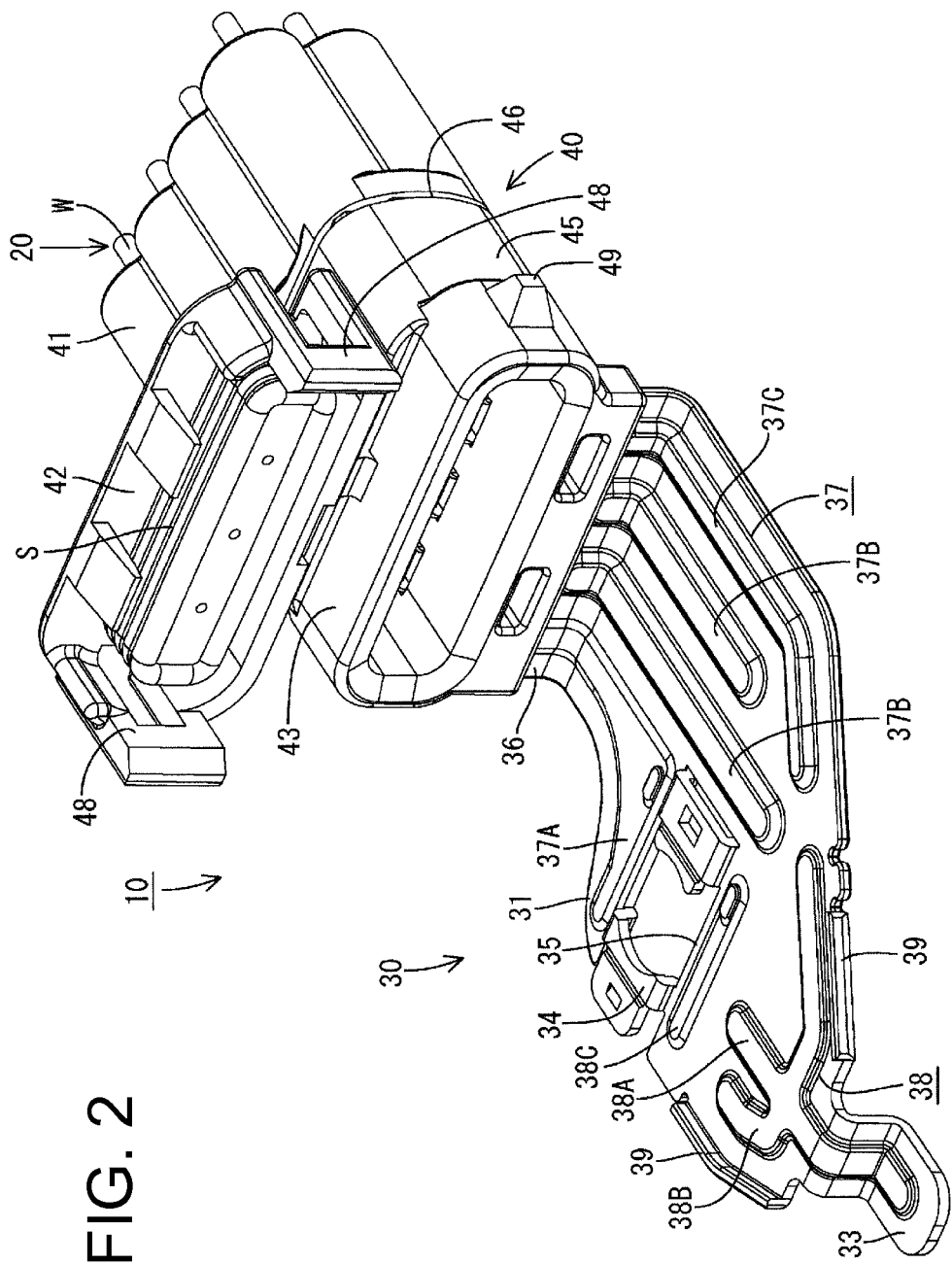
FIG. 2 is a perspective view showing a state where a lid body is removed from the joint connector of FIG. 1.

The housing 40 is made of synthetic resin and includes, as shown in FIGS. 1 and 2, a seal member accommodating portion 43 into which a lid body 42 attached with a seal member S made of rubber is mountable. This lid body 42 is integrally formed to the housing 40 by a flexible hinge 44. A terminal holding portion 45 for holding the wire-side terminals 21 are connected before the seal member accommodating portion 43, and the rubber plug accommodating portion 41 is provided before this terminal holding portion 45. Note that a breaking groove 46 is circumferentially provided between the rubber plug accommodating portion 41 and the terminal holding portion 45, and the first ground wires W and the wire-side terminals 21 are removed from the body of the vehicle together with the rubber plug accommodating portion 41 by breaking the breaking groove 46 when the wiring harness is disassembled.

Figure 3:
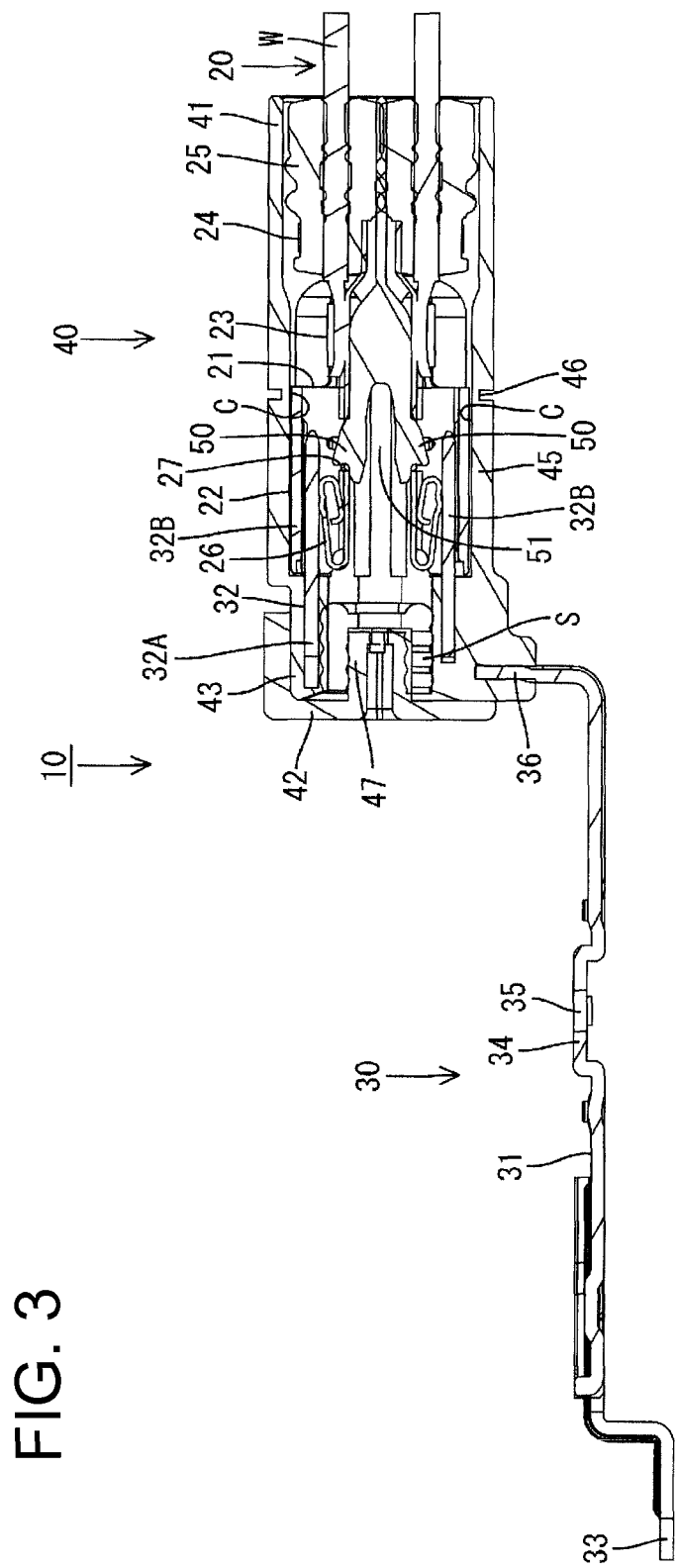
FIG. 3 is a section showing an internal structure when the joint connector is cut in a vertical direction.

As shown in FIG. 3, the lid body 42 includes a mounting projection 47 projecting from the outside to the inside of the housing 40, and the seal member S is externally fitted on and fixed to this mounting projection 47. Further, since the seal member S is pressed between the outer peripheral surface of the mounting projection 47 and the inner peripheral surface of the seal member accommodating portion 43, the entrance of water into the housing 40 from behind is prevented. Further, a pair of left and right locking pieces 48, 48 are provided on outer side surfaces of the lid body 42 as shown in FIG. 2, and a pair of left and right locking projections 49, 49 engageable with the respective locking pieces 48, 48 are provide on outer side surfaces of the housing 40 corresponding to the respective locking pieces 48, 48. Thus, when the lid body 42 is mounted on a rear part of the housing 40, the mounting projection 47 and the seal member S are fitted into an opening of the seal member accommodating portion 43 and the respective locking pieces 48, 48 are locked in a state engaged with the corresponding locking projections 49, 49.

Figure 5:
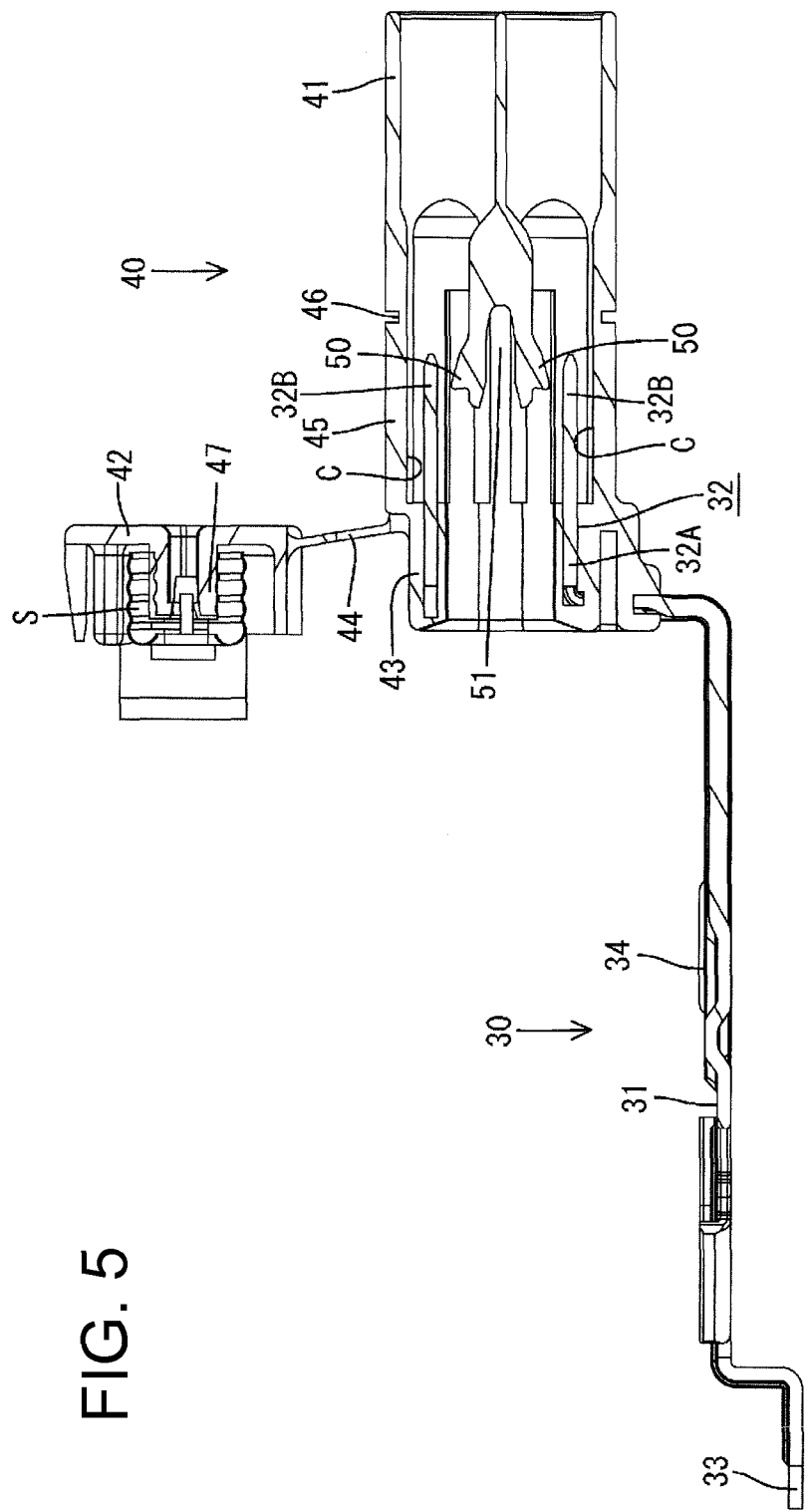
FIG. 5 is a section showing an internal structure when the housing is cut in the vertical direction.

As shown in FIG. 5, cavities C for accommodating the wire-side terminals 21 are formed in the terminal holding portion 45. These cavities C are formed in two upper and lower rows and four columns in a lateral direction. Pairs of upper and lower locking lances 50, 50 are vertically deflectably formed on partition walls partitioning between the cavities C in the upper row and those in the lower row. Each locking lance 50 is cantilevered backward from the partition wall.

The partition walls vertically partitioning the respective cavities C are formed to extend forward from base end parts of the locking lances 50, but is not present behind the base end parts of the locking lances 50. Further, partition walls laterally partitioning the respective cavities C are not present behind the locking lances 50 at least in a height range where the locking lances 50 are formed. Specifically, a single accommodation space for collectively accommodating the respective wire-side terminals 21 is formed behind the base end parts of the locking lances 50 in the terminal holding portion 45.

The locking lances 50, 50 vertically adjacent to each other are arranged back to back (facing in opposite directions with respect to a vertical direction) and an insufficient insertion detection space 51 into which a flat plate for detection (not shown) is to be inserted is formed between these locking lances 50, 50. This insufficient insertion detection space 51 is a deflection space common to the respective locking lances 50, 50. Thus, if it is attempted to simultaneously insert the respective wire-side terminals 21, 21 into the respective cavities C, C, the respective locking lances 50, 50 interfere with each other in the insufficient insertion detection space 51. The interference of the respective locking lances 50, 50 in the insufficient insertion detection space 51 can be avoided by inserting the respective wire-side terminals 21, 21 one by one into the respective cavities C, C.

A lance hole 27 into which the locking lance 50 is inserted for locking is formed on the bottom wall of the terminal main body 22 of the wire-side terminal 21. In a state where the locking lance 50 is fitted in the lance hole 27 and locked in the front-back direction, the wire-side terminal 21 is held in the terminal holding portion 45 in a state accommodated in the cavity C. At this time, the rubber plug 25 is accommodated in the rubber plug accommodating portion 41 and pressed between the inner peripheral surface of the rubber plug accommodating portion 41 and the outer peripheral surface of the insulation coating W2. This prevents the entrance of water into the housing 40 from the rubber plug accommodating portion 41.

Figure 6:
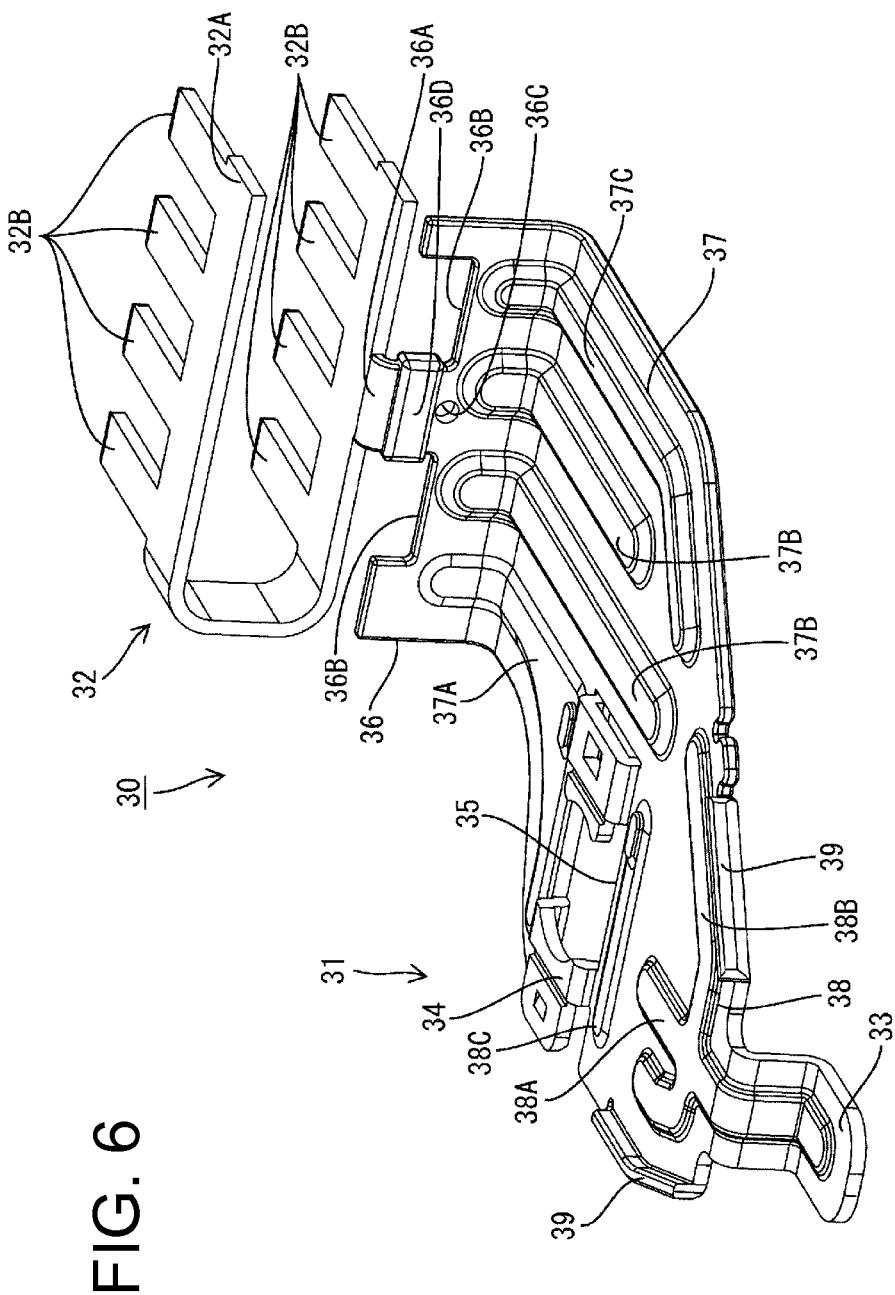
FIG. 6 is a perspective view of a conductive plate.

Next, the conductive plate 30 is described. This conductive plate 30 is formed by press-working a metal plate with good conductivity. As shown in FIG. 6, the conductive plate 30 includes a conductive plate main body 31 constituting a main part thereof, a connecting portion 32 provided on one end of the conductive plate main body 31 and a rotation preventing piece 33 provided on the other end of the conductive plate main body 31. Note that, in the description of the configuration of the conductive plate 30, vertical and lateral directions are based on FIG. 8 and a width direction is based on a vertical direction of FIG. 70.

Figure 7:
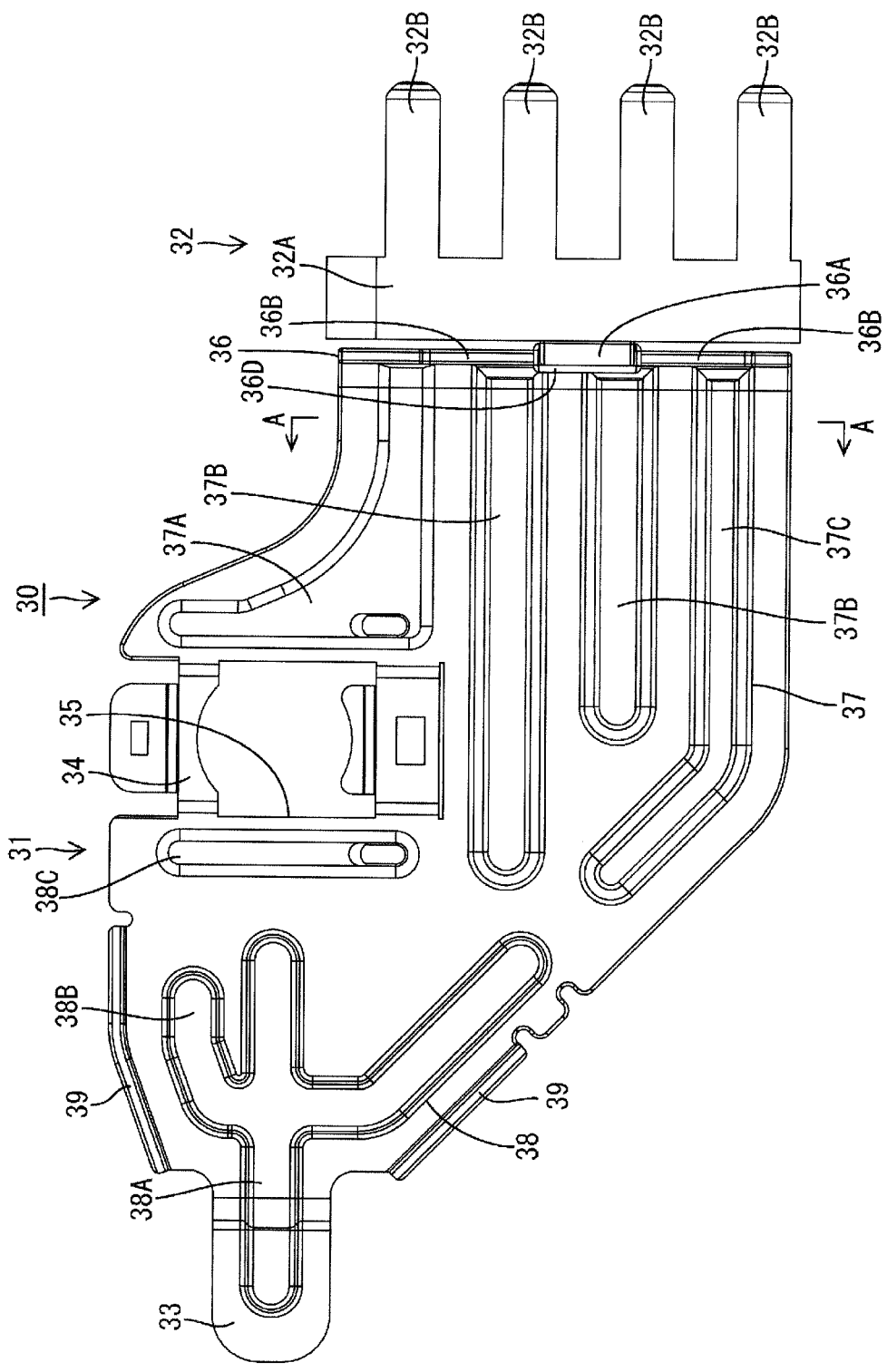
FIG. 7 is a plan view of the conductive plate.

As shown in FIG. 7, the rotation preventing piece 33 is arranged eccentrically with respect to the connecting portion 32 in the width direction. This rotation preventing piece 33 extends downward from the left edge of the conductive plate main body 31 and then extends to the left from an extending end of the downward extending part. The rotation preventing piece 33 prevents the rotation of the conductive plate main body 31 associated with a bolting operation by being fitted into a rotation preventing recess (not shown) formed on the body of the vehicle. A body-side grounding portion 34 is formed at a position coaxial with the rotation preventing piece 33 in the conductive plate main body 31.

This body-side grounding portion 34 is arranged near a center between the rotation preventing piece 33 and the connecting portion 32 in the lateral direction. The body-side grounding portion 34 is formed with a bolt hole 35 into which the ground bolt described above is insertable. Further, the second ground terminal described above can be slid to be assembled with the body-side grounding portion 34. When the ground bolt is inserted and threadably engaged with a nut (not shown) for bolting in a state where the second ground terminal is assembled with the body-side grounding portion 34, the conductive plate 30 and the second ground terminal are connected to the ground section on the body.

Figure 8:
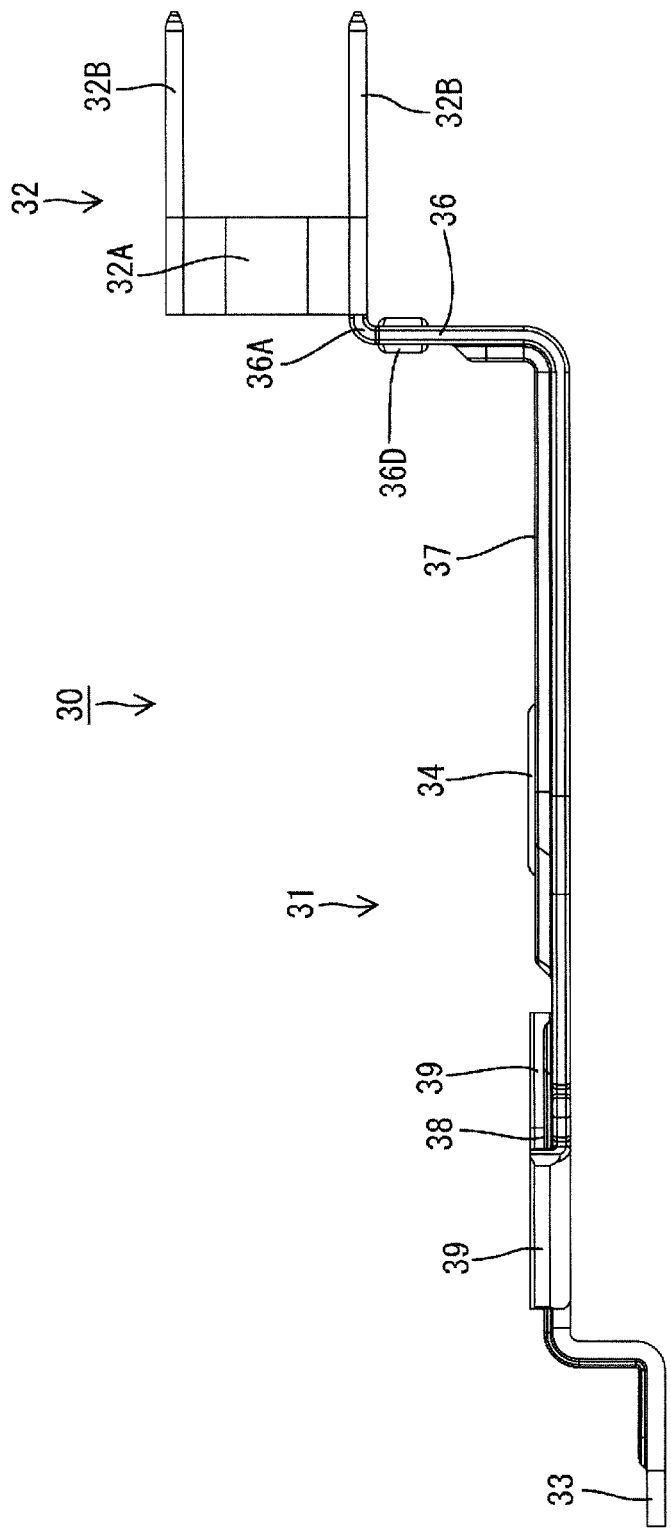
FIG. 8 is a left side view of the conductive plate.
Figure 9:
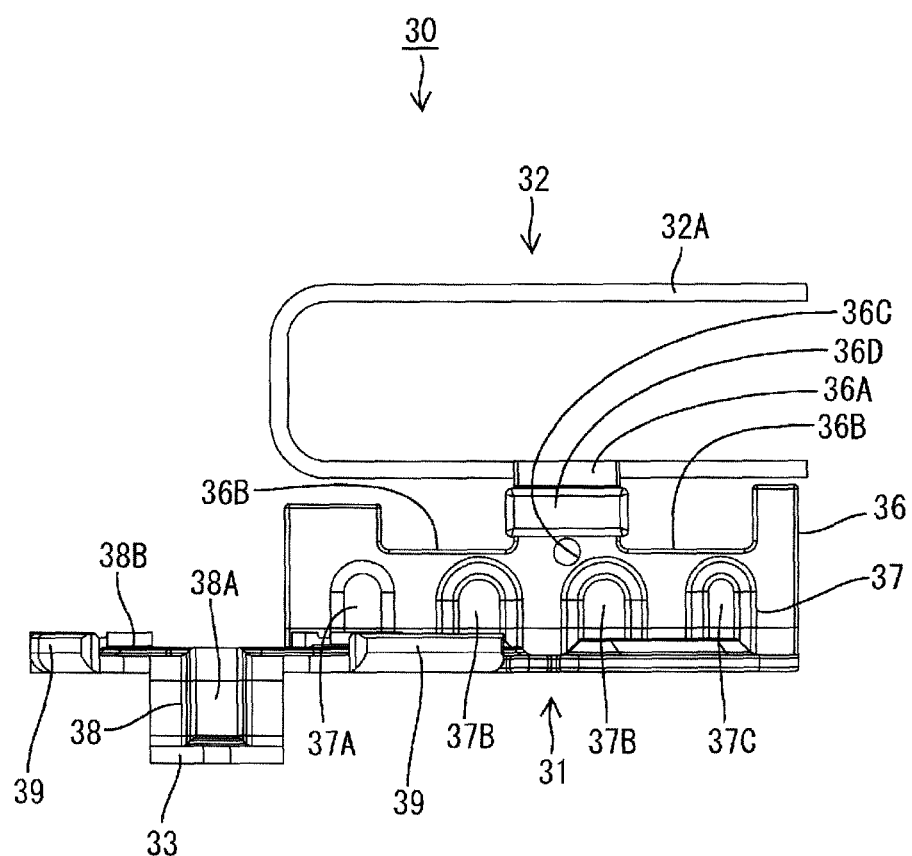
FIG. 9 is a rear view of the conductive plate.

The connecting portion 32 includes a linking portion 32A having a substantially laterally open U shape as shown in FIG. 9, and a plurality of terminal connecting portions 32B project to the right from the right edge of this linking portion 32A as shown in FIG. 7. Each terminal connecting portion 32B is in the form of a flat tab and projects, and four terminal connecting portions 32B are arranged in the width direction in each of two upper and lower rows. The respective terminal connecting portions 32B are integrally formed by the linking piece 32A. Further, as shown in FIG. 8, the linking piece 32A is coupled to the right edge of the conductive plate main body 31 via a step portion 36.

As shown in FIG. 6, the step portion 36 rises upward from the right edge of the conductive plate main body 31. Further, a supporting piece 36A narrower than the step portion 36 is provided on the upper edge of the step portion 36, and the upper edge of the step portion 36 is coupled to the left edge of the linking piece 32A via this supporting piece 36A. The supporting piece 36A is arranged in a widthwise center of the upper edge of the step portion 36 and a pair of cuts 36B are formed at opposite widthwise sides of this supporting piece 36A. The supporting piece 36A is bent substantially at a right angle and coupled to the linking piece 32A, and the linking piece 32A and the conductive plate main body 31 are arranged substantially in parallel. Further, a through hole 36C is formed to penetrate through a boundary part between the supporting piece 36A and the step portion 36 in a thickness direction. Furthermore, a sealing material 36D made of resin is applied over the entire circumference of the supporting piece 36A above the through hole 36C.

Figure 4:
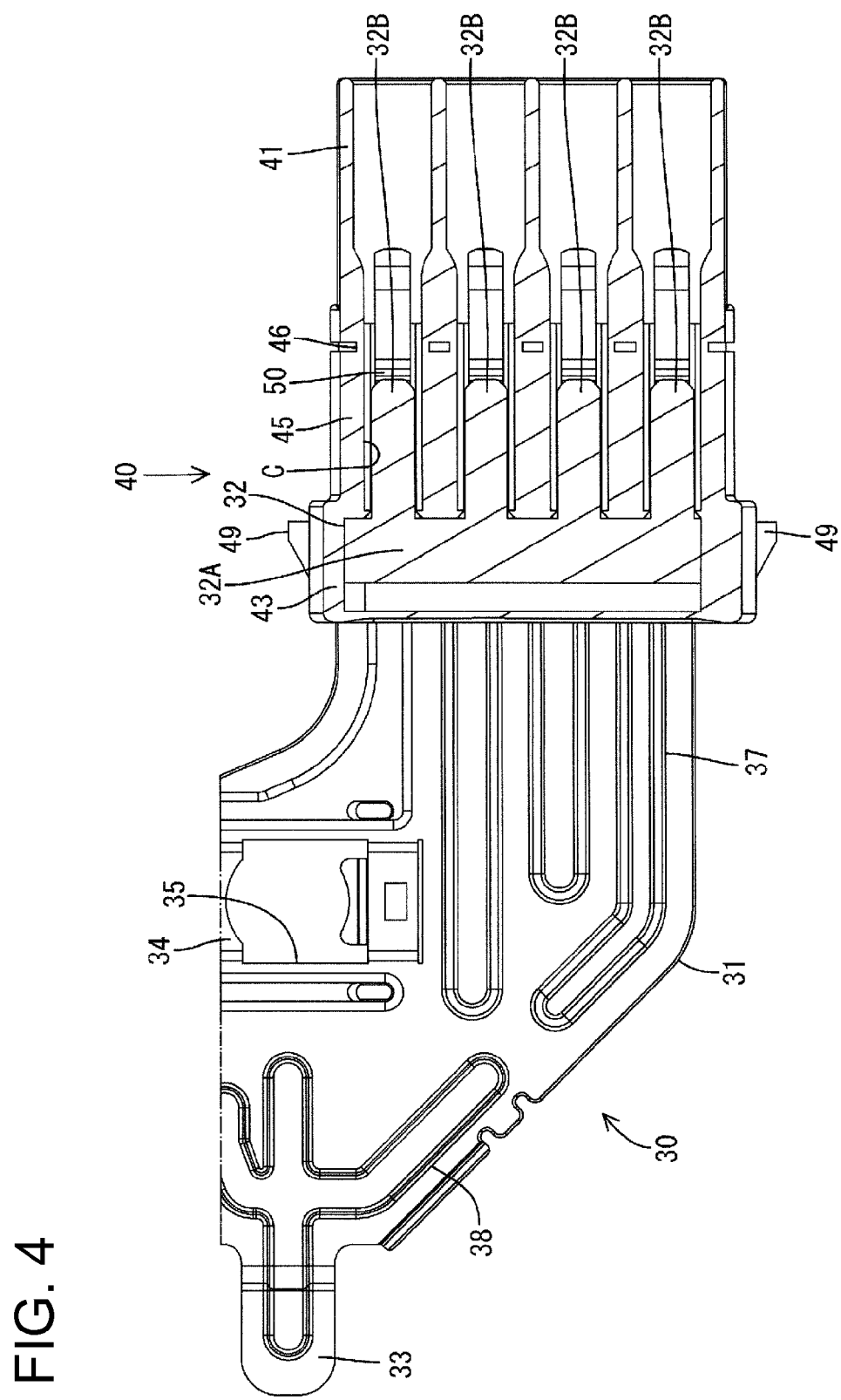
FIG. 4 is a section showing an internal structure when a housing is cut in a horizontal direction.

As shown in FIG. 3, the housing 40 is integrally formed to the conductive plate 30. The linking piece 32A and a part of the step portion 36 of the conductive plate 30 are insert-molded with the seal member accommodating portion 43 of the housing 40. As shown in FIG. 4, the respective terminal connecting portions 32B are provided to project forward from the front wall of the seal member accommodating portion 43 toward the interior of the terminal holding portion 45. Specifically, a range from an upper half of the step portion 36 to the linking piece 32A via the supporting piece 36A is embedded in the seal member accommodating portion 43, and a resin material forming the seal member accommodating portion 43 penetrates through the respective cuts 36B and the through hole 36C in the front-back direction.

In other words, the resin materials arranged at both front and rear sides of the step portion 36 are molded to be coupled to each other via the respective cuts 36B and the through hole 36C and cover the supporting piece 36A over the entire circumference. The sealing material 36D applied to this supporting piece 36A functions as a primer for the resin material and the metal material and holds these materials in close contact, thereby preventing the entrance of water into the housing 40 through interfaces of the seal member accommodating portion 43 and the supporting piece 36A. In addition, since the resin materials on the front and rear sides are coupled through the respective cuts 36B and the through hole 36C, the separation of the interfaces of the resin material and the metal material is prevented, with the result that it can be reliably prevented that sealability is lost on the interfaces of the resin material and the metal material.

As shown in FIG. 2, the seal member accommodating portion 43 is substantially in the form of a rectangular tube and has open front and rear ends, so that the insufficient insertion detection space 51 of the terminal holding portion 45 is exposed on the rear side. As shown in FIG. 3, the linking portion 32A is embedded in the seal member accommodating portion 43. Specifically, the seal member accommodating portion 43 in which the seal member S is accommodated has high rigidity by the linking portion 32 being embedded therein and can restrict the widening of the opening of the seal member accommodating portion 43 due to deterioration over time (such as resin deformation caused by creeping). Thus, an adhesion force between the seal member S and the seal member accommodating portion 43 is not reduced and sealability of the seal member S can be maintained over a long period of time.

As shown in FIGS. 6 to 10, a plurality of ribs are arranged on the conductive plate main body 31 of this embodiment. As shown in FIG. 7, shown four ribs arranged in a range from the body-side grounding portion 34 to the connecting portion 32 constitute a first rib group 37 and shown two ribs arranged in a range from the body-side grounding portion 34 to the rotation preventing piece 33 constitute a second rib group. Each rib group 37, 38 is formed to project upward by striking parts of the conductive plate main body 31.

Figure 10:
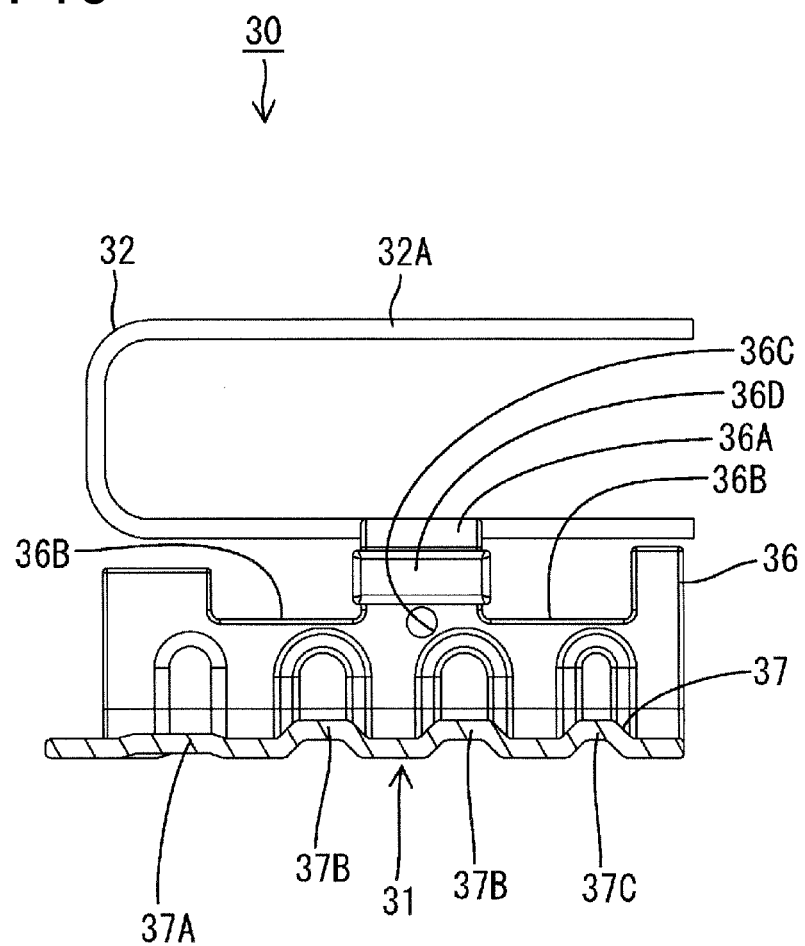
FIG. 10 is a section along A-A of FIG. 7.

As shown in FIG. 10, the first rib group 37 is composed of a low-rigidity rib 37A arranged at a position closest to the body-side grounding portion 34, a high-rigidity rib 37C arranged at a position most distant from the body-side grounding portion 34, and shown two middle-rigidity ribs 37B, 37B arranged between the both ribs 37A, 37C. The low-rigidity rib 37A has a smallest height in the first rib group 37, and the middle-rigidity ribs 37B and the high-rigidity rib 37C have the same height. Further, the low-rigidity rib 37A has a smallest width and the high-rigidity rib 37C has a largest width. Widths of the middle-rigidity ribs 37B are intermediate widths between the width of the low-rigidity rib 37A and that of the high-rigidity rib 37C. Further, the first rib group 37 is provided from the conductive plate main body 31 to the step portion 36.

The second rib group 38 is composed of a main rib 38A arranged at a position coaxial with the body-side grounding portion 34, a sub rib 38B perpendicular to this main rib 38A and an auxiliary rib 38C arranged near the body-side grounding portion 34. The main and sub ribs 38A, 38B have the same height and the same width. The main rib 38A is arranged in a range from the conductive plate main body 31 to the rotation preventing piece 33. The sub rib 38B is arranged along the outer peripheral edge of the conductive plate main body 31 to surround the body-side grounding portion 34. Furthermore, the auxiliary rib 38C is provided at a left edge part of the bolt hole 35 and has the same height as the low-rigidity rib 37A of the first rib group 37.

According to the first rib group 37, the low-rigidity rib 37A is arranged at the position closest to the body-side grounding portion 34 and vibration transmitted from the body of the vehicle cannot be absorbed only by the low-rigidity rib 37A. The vibration that cannot be absorbed by the low-rigidity rib 37A is transmitted to the respective middle-rigidity ribs 37B, 37B, but cannot be completely absorbed only by the respective middle-rigidity ribs 37B, 37B. As a result, the vibration that cannot be absorbed by the middle-rigidity ribs 37B, 37B is transmitted to the high-rigidity rib 37C. Specifically, in this embodiment, the rib arranged more distant from the body-side grounding portion 34 is set to have higher rigidity than the rib arranged close thereto. In this way, the vibration transmitted from the body is transmitted to the entire conductive plate main body 31 from the body-side grounding portion 34 and a stress can be dispersed over the entire conductive plate main body 31.

According to the second rib group 38, the auxiliary rib 38C is arranged at the position near the body-side grounding portion 34 and vibration transmitted from the body of the vehicle cannot be absorbed only by the auxiliary rib 38C. The vibration that cannot be absorbed by the auxiliary rib 38C is transmitted to the main and sub ribs 38A, 38B. Thus, similarly to the first rib group 37, the vibration transmitted from the body is transmitted to the entire conductive plate main body 31 from the body-side grounding portion 34 and a stress can be dispersed over the entire conductive plate main body 31. Note that reinforcing walls 39 rise at positions of the outer peripheral edge of the conductive plate main body 31 along the sub rib 38B and the rigidity of the sub rib 38B is further increased by these reinforcing walls 39.

Further, vibration is transmitted to the conductive plate 30 from the respective first ground wires W via the connecting portion 32 and the step portion 36. Here, since no partition walls partitioning between adjacent ones of the respective wire-side terminals 21, 21 are present in the terminal holding portion 45 and the vibration from the respective first ground wires W is absorbed by fitted parts of the respective wire-side terminals 21 and the respective terminal connecting portions 32B since the wire-side terminals 21 are loosely movably supported by the terminal connecting portions 32B. Thus, the vibration transmitted to the conductive plate main body 31 via the step portion 36 can be alleviated and breakage due to a stress concentrated on a corner part between the step portion 36 and the conductive plate main body 31 can be prevented.

Next, functions of this embodiment configured as described above are described. First, how to assemble the joint connector 10 is described. A plurality of first ground wires W to be grounded are pulled out from the wiring harness main body, the wire-side terminals 21 are mounted on the ends of the respective first ground wires W, and the second ground terminal is mounted on the end of the second ground wire. Note that these terminals may be mounted before the wiring harness is assembled.

Subsequently, the wire-side terminals 21 are successively inserted into the cavities C of the housing 40. Then, the terminal main body 22 of each wire-side terminal 21 is fitted to the terminal connecting portion 32B in a waiting state and the resilient contact piece 26 resiliently comes into contact with the terminal connecting portion 32B, whereby the wire-side terminal 21 and the terminal connecting portion 32B are conductively connected. When the terminals are completely fitted, the locking lance 50 is inserted in the lance hole 27 and the wire-side terminal 21 and the locking lance 50 are locked into each other in the front-back direction, whereby the wire-side terminal 21 is held and retained in the terminal holding portion 45. Separately, the second ground terminal is attached to the body-side grounding portion 34 while being slid and the second ground terminal and the body-side grounding portion 34 are assembled one over the other.

Subsequently, the ground bolt of the body is inserted into the bolt holes 35 and bolting is performed. Specifically, the ground bolt is inserted through the bolt hole 35 provided in each of the body-side grounding portion 34 and the second ground terminal, a placing surface of the body-side grounding portion 34 is placed on the wall surface of the body and the nut is threadably engaged with the ground bolt and tightened, whereby the body-side grounding portion 34 and the second ground terminal are pressed and fixed between this nut and the wall surface of the body. In this way, the respective first ground wires W are grounded to the body via the conductive plate 30 and the respective wire-side terminals 21 and the second ground wire is also grounded to the body via the second ground terminal placed below the body-side grounding portion 34.

Subsequently, the lid body 42 is mounted to the seal member accommodating portion 43 from behind. The seal member S mounted on the mounting projection 47 of the lid body 42 is inserted into the seal member accommodating portion 43 and pressed between the outer peripheral surface of the mounting projection 47 and the inner peripheral surface of the seal member accommodating portion 43 to seal the opening of the seal member accommodating portion 43. On the other hand, the rubber plug 25 is accommodated in each rubber plug accommodating portion 41 arranged on the front side of the housing 40 and pressed between the outer peripheral surface of the insulation coating W2 of the first ground wire W and the inner peripheral surface of the rubber plug accommodating portion 41, whereby the opening of each rubber plug accommodating portion 41 is sealed. Note that although the supporting piece 36A of the conductive plate 30 is insert-molded with a lower part of the seal member accommodating portion 43, the sealing material 36D is applied to this supporting piece 36A and held in close contact with both the resin material and the metal material, whereby the interfaces of the supporting piece 36A and the seal member accommodating portion 43 are sealed. This causes the interior of the housing 40 to be sealed in a fluid-tight manner.

Since the joint connector 10 is generally used by being mounted in the vehicle, various types of vibration are transmitted to the conductive plate main body 31 via the body-side grounding portion 34 fixed to the ground bolt of the body. Here, the low-rigidity rib 37A and the auxiliary rib 38C are provided near the body-side grounding portion 34 of the conductive plate main body 31, but the vibration cannot be entirely absorbed since the heights of these ribs 37A, 38B are suppressed and the rigidities thereof are low. As a result, the vibration is transmitted to the middle-rigidity ribs 37B, the high-rigidity rib 37C, the main rib 38A and the sub rib 38B, whereby a stress can be dispersed from the conductive plate main body 31 to the step 36. Thus, the conductive plate main body 31 is not broken due to metal fatigue near the body-side grounding portion 34.

On the other hand, vibration transmitted from the first ground wires W to the joint connector 10 can be absorbed at the fitted parts of the terminal connecting portions 32B and the wire-side terminals 21 since the wire-side terminals 21 are loosely movably supported by the terminal connecting portions 32B. Further, a stress applied to the linking portion 32A can be dispersed to the step portion 36. However, since the stress applied to the step portion 36 is small, there is no breakage due to the stress concentrated on the corner part between the conductive plate main body 31 and the step portion 36.

As described above, in this embodiment, the low-rigidity rib 37A and the auxiliary rib 38C having relatively low rigidity are formed near the body-side grounding portion 34 on the conductive plate main body 31 and the high-rigidity rib 37C and the sub rib 38B are formed along the outer peripheral edge of the conductive plate main body 31. Thus, a stress is not concentrated near the body-side grounding portion 34 and can be dispersed over the entire conductive plate main body 31. Further, since the respective ribs are formed to have different heights and widths, the rigidities of the respective ribs can be appropriately adjusted.

Further, since the linking portion 32A for coupling the respective terminal connecting portions 32B is insert-molded in the housing 40 and covered with the resin of the housing 40, each terminal connecting portion 32B can be firmly held with respect to the housing 40. Further, since the linking portion 32A is coupled to the right edge of the conductive plate main body 31 via the step portion 36, a stress transmitted to the conductive plate main body 31 can be alleviated by being dispersed to the step portion 36. Further, since the linking portion 32A is coupled to the right edge of the conductive plate main body 31 via the step portion 36, a stress applied to the linking portion 32A can be dispersed to the step portion 36. Furthermore, the first rib group 37 is provided from the conductive plate main body 31 to the step portion 36, the step portion 36 can be reinforced by the first rib group 37.

The present invention is not limited to the above described and illustrated embodiment. For example, the following embodiments are also included in the technical scope of the present invention.

Although a plurality of ribs are provided in the above embodiment, only one rib may be provided according to the present invention. For example, a tapered rib whose height gradually increases from the vicinity of the body-side grounding portion 34 toward the outer peripheral edge of the conductive plate main body 31 may be provided or a tapered rib whose width gradually becomes narrower from the vicinity of the body-side grounding portion 34 toward the outer peripheral edge of the conductive plate main body 31 may be provided.

Although a part of the conductive plate 30 is insert-molded in the housing 40 in the above embodiment, a conductive plate may be formed separately from a housing and assembled with the housing according to the present invention.

Although the conductive plate 30 includes the step portion 36 in the above embodiment, a conductive plate may be arranged behind a linking portion without providing any step portion according to the present invention.

Although the first rib group 37 is provided from the conductive plate main body to the step portion in the above embodiment, a first rib group may be provided only on the conductive plate main body according to the present invention.

The invention claimed is:

1. A conductive plate for grounding a plurality of wires to a body of a vehicle, comprising: a conductive plate main body including a body-side grounding portion to be grounded to the body by being bolted to the body; a plurality of terminal connecting portions provided on one end of the conductive plate main body and to be connected to wire-side terminals electrically connected to the respective wires; and a protrusion comprising a plurality of ribs projecting from the conductive plate main body in a thickness direction of the conductive plate main body and provided, the plurality of ribs including at least a low-rigidity rib having a first height in the thickness direction of the conductive plate main body and a first width normal to the thickness direction of the conductive plate main body and a high-rigidity rib having a second height larger than the first height and a second width larger than the first width, the low-rigidity rib arranged at a position closer to the body-side grounding portion than the high-rigidity rib to set the rigidity of the conductive plate main body to be low at a position close to the body-side grounding portion and high at a position distant from the body-side grounding portion.

2. A joint connector, comprising:
the conductive plate of claim 1,
a plurality of terminal-provided wires in each of which a wire-side terminal is electrically connected to a wire; and
a housing integrally molded to the conductive plate and configured to hold the respective terminal-provided wires connected to the respective terminal connecting portions of the conductive plate.

3. A joint connector according to claim 2, wherein a coupling portion for coupling the respective terminal connecting portions is insert-molded in the housing.

4. A joint connector according to claim 3, wherein the coupling portion is coupled to one end of the conductive plate main body via a step portion.

5. A joint connector according to claim 4, wherein the protrusion is provided from the conductive plate main body to the step portion.

6. A conductive plate according to claim 1, wherein the plurality of ribs includes at least one middle-rigidity rib arranged between the low-rigidity rib and the high rigidity rib, the at least one middle-rigidity rib having a third height equal to the second height and a third width larger than the first width and smaller than the second width.

* * * * *